(12) United States Patent
Hecht et al.

(10) Patent No.: US 10,783,325 B1
(45) Date of Patent: Sep. 22, 2020

(54) VISUAL DATA MAPPING

(71) Applicant: INTERAI INC., East Rockaway, NY (US)

(72) Inventors: Imri Hecht, Ramat Gan (IL); Tomer Suarez, Ramat Gan (IL)

(73) Assignee: INTERAI, INC., East Rockaway, NY (US)

( * ) Notice: Subject to any disclaimer, the term of this patent is extended or adjusted under 35 U.S.C. 154(b) by 0 days.

(21) Appl. No.: 16/808,706

(22) Filed: Mar. 4, 2020

(51) Int. Cl.
*G06F 40/174* (2020.01)
*G06F 16/93* (2019.01)
*G06F 3/0483* (2013.01)
*G06K 9/20* (2006.01)
*G06Q 30/06* (2012.01)
*G06K 9/00* (2006.01)
*G06F 17/00* (2019.01)

(52) U.S. Cl.
CPC .......... *G06F 40/174* (2020.01); *G06F 3/0483* (2013.01); *G06F 16/93* (2019.01); *G06K 9/00463* (2013.01); *G06K 9/00469* (2013.01); *G06K 9/2054* (2013.01); *G06Q 30/06* (2013.01)

(58) Field of Classification Search
CPC ...... G06F 40/174; G06F 3/0483; G06F 16/93; G06F 17/248; G06Q 30/06; G06K 9/2054; G06K 9/00469; G06K 9/00463
See application file for complete search history.

(56) References Cited

U.S. PATENT DOCUMENTS

| | | | |
|---|---|---|---|
| 6,741,737 B1 | 5/2004 | Lenoir | |
| 10,628,633 B1* | 4/2020 | Geng | G06F 40/174 |
| 2007/0168382 A1* | 7/2007 | Tillberg | G06K 9/00449 |
| 2009/0158090 A1 | 6/2009 | Bauchot et al. | |
| 2010/0302604 A1 | 12/2010 | Kodimer et al. | |
| 2017/0243059 A1 | 8/2017 | Goyal | |

OTHER PUBLICATIONS

Pureinfotech, "How to import printed data table from picture into Excel", Retrieved from the internet at: https://pureinfotech.com/import-printed-data-table-picture-excel/, 2019.

* cited by examiner

*Primary Examiner* — Quoc A Tran
(74) *Attorney, Agent, or Firm* — The Roy Gross Law Firm, LLC; Roy Gross

(57) ABSTRACT

A method comprising receiving an image of an electronic document comprising data fields and corresponding textual regions; processing said image to obtain (i) a collection of said data fields comprising an indication of a location and a field type, and (ii) an array of said textual regions comprising an indication of a location and a content; creating a mapping comprising associations of data fields in said collection with textual regions in said array based, at least in part, on analyzing a geometric relationship between each of said data fields and each of said textual regions; deriving at least one context rule for evaluating said associations, based, at least in part, on identifying a structure of said electronic document; and determining a correctness of at least one of said associations in said mapping, based, at least in part, on said at least one context rule.

20 Claims, 13 Drawing Sheets

ORDER FORM

1
- First Name
- Last Name
- Address
- City

2
- Item 1
- Item 2
- Item 3

FIG. 4A

ORDER FORM

First Name / Last Name
Address 1
Address 2
Address 3
City / State
Country

ORDER FORM

1.
- First Name
- Last Name
- Address
- City

2.
- Item 1: Name, Quantity, Price
- Item 2: Name, Quantity, Price
- Item 3: Name, Quantity, Price

VISUAL DATA MAPPING

BACKGROUND OF THE INVENTION

The invention relates to the field of automated image analysis.

In an enterprise environment, e.g., a customer service center, representatives must manually complete many similar data forms per day with similar information, e.g., first name, last name, street address, and telephone number. Manually entering such information repeatedly is labor-intensive, time-consuming, and prone to human error. (e.g., misspelling names, transposing numbers, etc.).

Known solutions for this problem may rely on tagging of form fields. For example, websites may apply tags to documents that identify common fields, such as names, e-mail addresses, etc. However, these solutions rely on the creator of the document to provide field tagging. As such, these solutions may not be universally applicable with respect to different types of data forms, and thus their utility is limited.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a system comprising: at least one hardware processor; and a non-transitory computer-readable storage medium having stored thereon program code, the program code executable by the at least one hardware processor to: receive an image of an electronic document, wherein said electronic document comprises one or more data fields and corresponding textual regions, process said image to obtain: (i) a collection of said data fields comprising an indication of a location within said image and a field type of each of said data fields in said collection, and (ii) an array of said textual regions comprising an indication of a location within said image and a content of each of said textual regions in said array, create a mapping comprising associations of data fields in said collection with textual regions in said array based, at least in part, on analyzing a geometric relationship between each of said data fields and each of said textual regions, derive at least one context rule for evaluating said associations, based, at least in part, on identifying a structure of said electronic document, and determine a correctness of at least one of said associations in said mapping, based, at least in part, on said at least one context rule.

There is also provided, in an embodiment, a method comprising: receiving an image of an electronic document, wherein said electronic document comprises one or more data fields and corresponding textual regions; processing said image to obtain: (i) a collection of said data fields comprising an indication of a location within said image and a field type of each of said data fields in said collection, and (ii) an array of said textual regions comprising an indication of a location within said image and a content of each of said textual regions in said array; creating a mapping comprising associations of data fields in said collection with textual regions in said array based, at least in part, on analyzing a geometric relationship between each of said data fields and each of said textual regions; deriving at least one context rule for evaluating said associations, based, at least in part, on identifying a structure of said electronic document; and determining a correctness of at least one of said associations in said mapping, based, at least in part, on said at least one context rule.

There is further provided, in an embodiment, a computer program product comprising a non-transitory computer-readable storage medium having program code embodied therewith, the program code executable by at least one hardware processor to: receive an image of an electronic document, wherein said electronic document comprises one or more data fields and corresponding textual regions; process said image to obtain: (i) a collection of said data fields comprising an indication of a location within said image and a field type of each of said data fields in said collection, and (ii) an array of said textual regions comprising an indication of a location within said image and a content of each of said textual regions in said array; create a mapping comprising associations of data fields in said collection with textual regions in said array based, at least in part, on analyzing a geometric relationship between each of said data fields and each of said textual regions; and derive at least one context rule for evaluating said associations, based, at least in part, on identifying a structure of said electronic document; and determine a correctness of at least one of said associations in said mapping, based, at least in part, on said at least one context rule.

In some embodiments, the electronic document is presented as a graphical user interface (GUI) element, and said image is a screen capture of said GUI.

In some embodiments, each of the data fields is at least one of a data entry field and a data display field, and wherein each of said textual regions is one of a descriptor, a label, a title, a tag, an annotation, a caption, and a comment.

In some embodiments, the geometric relationship takes into account, with respect to each of said associations of one of said textual regions with one of said data fields, one or more of: a position of said textual region relative to said data field, an alignment of said textual region relative to said data field, and a distance between said textual region relative to said data field.

In some embodiments, the associations can comprise at least one of: a one-to-many association of a textual region to multiple data fields, a many-to-one association of multiple textual regions to a data field, and a locational overlap between a data field and a textual region.

In some embodiments, the identifying comprises identifying at least one of: sections in said electronic document, sub-sections in said electronic document, a vertical ordering of data fields in said electronic document, a horizontal ordering of data fields in said electronic document, average geometric distance between textual regions and data fields in said electronic document, and a tabular arrangement of data fields in said electronic document.

In some embodiments, the method further comprises, and the program instructions are further executable to, (i) access a set of data values and related labels, wherein said labels correspond, at least in part, to textual regions in said array; (ii) match at least some of said data values with said data fields in said collection, based on said correspondence; (iii) derive at least one additional context rule based on analyzing said matches; and (iv) determine a correctness of at least one of said associations in said mapping, based, at least in part, on said at least one additional context rule.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 1A-1C are sample electronic form documents;

FIGS. 4A-4D illustrate common electronic form structure, in accordance with some embodiments of the present invention; and FIGS. 5A-5D illustrate data entry conflicts and disambiguation issues, in accordance with some embodiments of the present invention.

DETAILED DESCRIPTION OF THE INVENTION

Disclosed herein are a system, method, and computer program product for automated analysis of electronic (e.g., computer) forms. In some embodiments, the present disclosure provides for automated form analysis, which may be used to determine the layout and structure of a form, for purposes of data entry and/or data extraction.

In some embodiments, the present disclosure provides for different techniques for analyzing an electronic document presented in an unstructured manner, e.g., as an image file, to define a structured document. In some embodiments, the document is an unstructured document, i.e., a document defined to include only primitive elements such as shapes (e.g., vector graphics), images (e.g., bitmaps), and glyphs. In some embodiments, the unstructured document does not specify any relationship or association between the primitive elements, or it specifies a minimum amount of such relationships and associations. In some embodiments, the unstructured document may have some amount of structure, but the structure is unrecognizable or not relied upon. In some embodiments the unstructured document has an unknown structure or is assumed to be unstructured. In some embodiments, the electronic document includes numerous elements, but does not include an indication that specifies the structural relationship between the elements and/or structural attributes of the document based on these primitive elements.

In some embodiments, the electronic document is a computer form which is a representation of a graphic user interface window which contains components and controls, such as buttons, text boxes, display fields, etc., as well as layout aids. These controls and components are positioned and sized within a window, to allow a user to enter data that is sent to a server for processing, and/or read data obtained from a database. Forms can resemble paper or database forms, because users fill out the forms using checkboxes, radio buttons, or text fields. For example, forms can be used to enter customer data, payment information, or survey results.

Figure 1A:
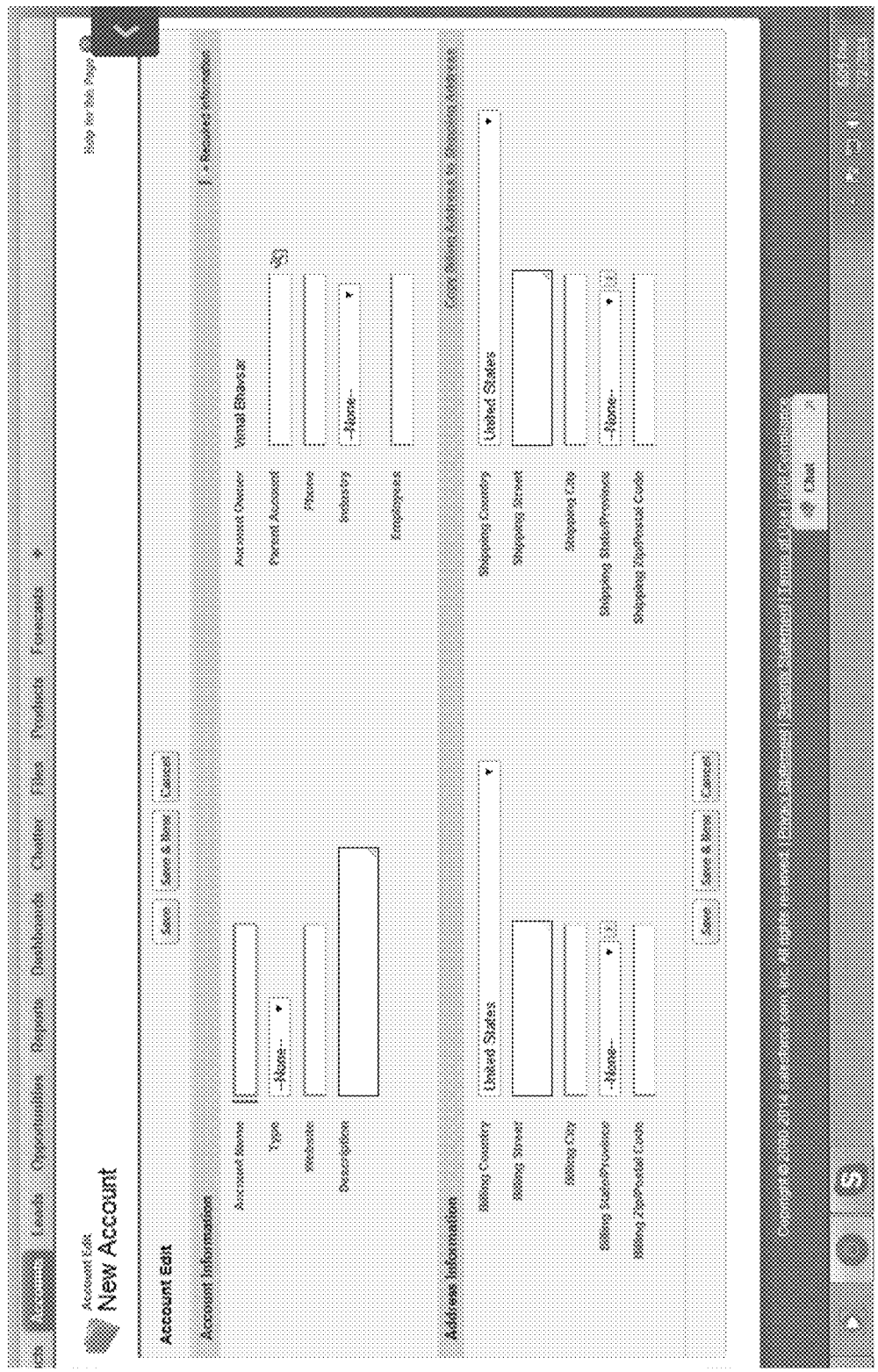

Electronic forms may comprise multiple data fields arranged independently of one another, and/or in a hierarchical arrangement. The data fields are used to enter and/or display data values. These values can be, e.g., contents, such as text or an image, or other signals, such as a mouse click, which could also lead to additional contents, such as a check for a check box. As can be seen in FIG. 1A, the hierarchical arrangement may comprise groups of fields, with each group typically identified by a group descriptor (e.g., "Address Information"). Within the group, each field may be accompanied by a field label (e.g., "Billing country," "Billing Street," "Billing City," etc.). Different electronic forms might represent the same data with different hierarchical arrangements. For example, in different electronic form, shipping address might come before or after the billing address.

In the context of enterprises, form automation can assist in managing, completing, and processing computer forms, such as applications, surveys, contracts, and other documents. A challenge to such automation is integrating electronic forms into an existing workflow or process, where existing data stores can be accessed and supplied to and from the forms with minimal manual input. Typically, such implementations require custom programming for specific forms and data sources. For example, a form filling software may have access to a mapping between data values and the corresponding fields in a form to be filled. The form-filling code then takes the data values and automatically completes the form using the provided mapping.

Given the sheer variety and volume of electronic forms that need to be completed, it would be advantageous to have a system that automatically understands which types of data is expected by each field in an electronic form, in the absence of provided form mapping and/or tagging, and without human intervention.

A potential advantage of the present disclosure is, therefore, in that it provides for an automated, accurate and repeatable method for determining the layout of any data form, including data entry and data display forms, and, optionally, automatically filling in or extracting data from the form using a variety of image analysis techniques. Thus, the present disclosure allow for integrating electronic forms into an existing workflow without the need for prior custom programming.

In some embodiments, the present disclosure is thus particularly useful in the context of enterprise data management, such as, for example, updating customer information databases, maintaining transaction records and maintaining billing information. In some embodiments, the present disclosure is thus particularly useful in the context of data forms which are presented in as an image and for which the form structure and/or tagging is not known or available.

As used herein, 'electronic form,' 'data form,' or simply 'form' or 'document' may refer interchangeably to any computer and/or electronic document, page, or form comprising, at least in part, form fields and/or data fields configured for entering and/or displaying data. The data fields may be arranged in any independent, grouped, categorized, hierarchical, and/or ranked arrangement within the form, wherein each field and/or group of fields may be associated with one or more textual and/or other descriptors providing semantic context to the data fields.

In some embodiments, form analysis according to the present disclosure may be based, at least in part, on a combination of image analysis techniques and textual analysis techniques.

In some embodiments, an image of a form may be received and analyzed to detect and locate one or more data fields as well as textual zones within the image. In some embodiments, the image may be a screen capture or part thereof of a GUI of a computerized application, e.g., an electronic form displayed to a user of a computerized system.

Figure 1B:
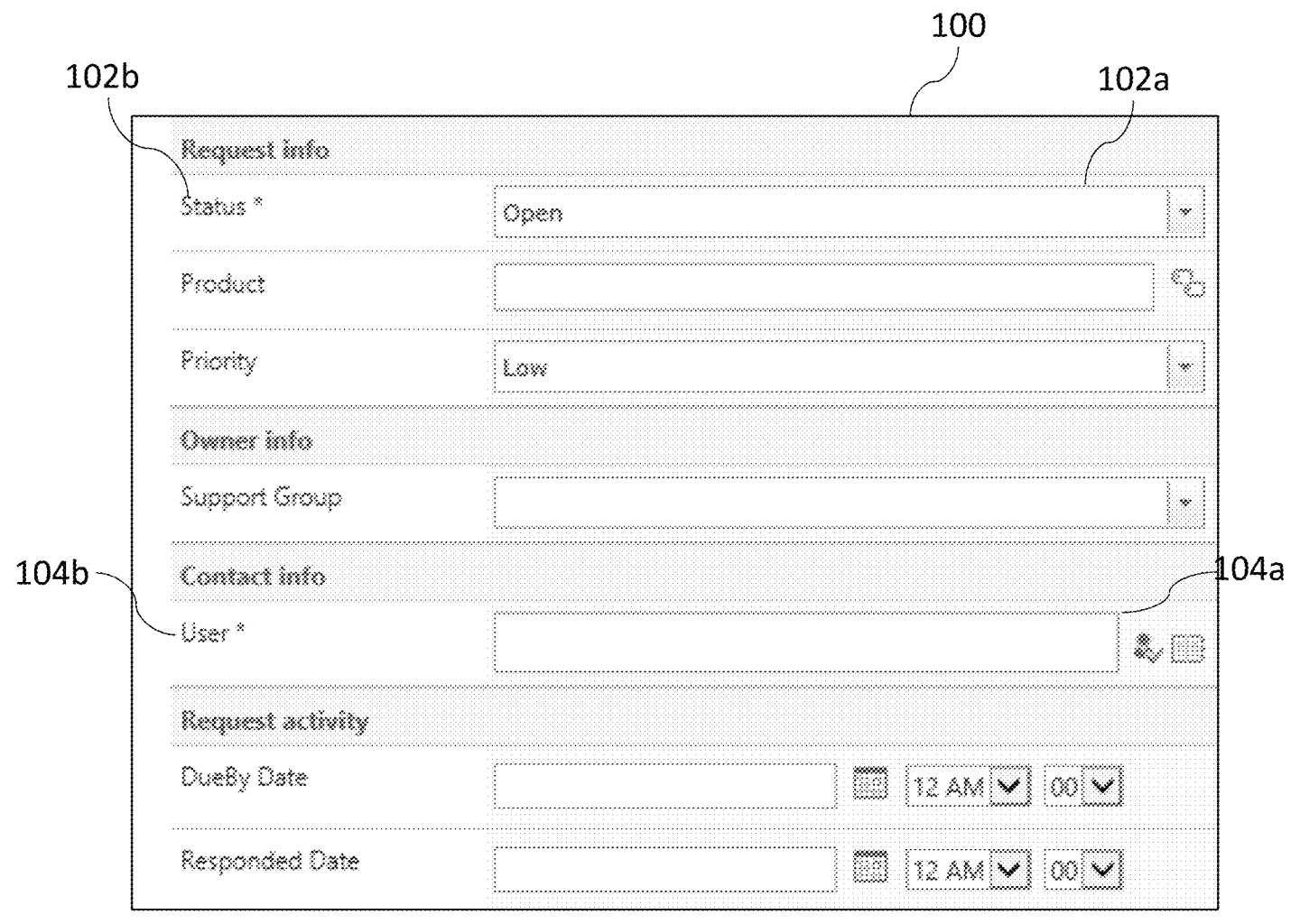

In some embodiments, the received form image depicts a plurality of data fields (e.g., form elements) and regions of text which may be associated with the data fields (e.g., field labels, captions, and/or descriptors). FIG. 1B is a form image segment 100 comprising 4 subsections "Request Info," "Owner Info," Contact Info," and Request Activity." The Request Info subsection comprises, e.g., a dropdown form element 102a associated with caption 102b "Status", which acts as a caption or label for dropdown field 102a. Similarly, the Contact Info subsection comprises a text field form element 104a associated with the text "User" 104b, which acts as a caption or label for text field 104a.

In some embodiments, the image may undergo one or more preprocessing stages, to, e.g., standardize, normalize, resize, and/or transform the image according to one or more transformation techniques. In some embodiments, preprocessing comprises image resizing, application of adaptive thresholding, and/or conversion of a color image into black-and-white.

In some embodiments, the image is processed to detect regions or blocks of text within the image, to generate a text regions array or collection representing image signals and locations of all regions of text in the image. In some embodiments, the image processing comprises detecting text region locations, e.g., x, y coordinates of pixels associated with each textual region within the image. In some embodiments, textual region locations are determined as bounding and/or enclosure borders that create a structured borders array corresponding to the text regions in the text regions array.

In some embodiments, the image signal comprising the text regions array may be processed using optical character recognition (OCR) techniques to convert the image signal into machine-encoded text. In some embodiments, natural language processing (NLP) and/or similar techniques may further be employed, e.g., natural language understanding (NLU), to enhance comprehension and disambiguation of the recognized textual content and/or extract a semantic meaning from the textual content. In some embodiments, text region identification software is used to detect the content of each textual region.

In some embodiments, the image is then processed to detect one or more data fields in the image, such as, but not limited to, text display boxes and/or regions, text entry boxes, select/dropdown fields, radio buttons, checkboxes, etc. In some embodiments, the image is processed to detect the field type and/or location of each data field. In some embodiments, the location of each data field is detected using one or more image processing techniques. In some embodiments, data fields may be detected based on, e.g., expected shape; one or more specified shape features such as lines and/or corners; shape aspect ratio (e.g., the ratio between a width and a height of a text box); location, position, and/or orientation within the image; and/or contextual neighborhood within the image.

In some embodiments, each of the textual regions in the text regions array may then be associated with one or more of the detected data fields, based, at least in part, on an analysis which maps textual regions to data fields. In some embodiments, such analysis may be based, at least in part, on a relative location analysis which takes into account one or more parameters such as relative positions, distance, relative alignment, structural order, orientation, relative placement, location of each element within the image, grouping, and the like. In some embodiments, the analysis may further take into account additional and/or other elements to generate the mapping, such as field type, and semantic meaning of textual regions.

In some embodiments, the mapping of text regions and data fields determines a semantic meaning for each data field, where the semantic meaning indicates a type of data semantically associated with the data field, e.g., the type of information that is expected and/or associated with the data field.

In some embodiments, the determined semantic meaning of each data field may be used in the context of automating form usage. In some embodiments, e.g., a dataset comprising a plurality of data values and associated labels may be received. In some embodiments, the labels may be matched with the recognized textual regions in the image, e.g., with continued reference to FIG. 1B, a label "User" may be matched with text region (caption) "User" 104b. In some embodiments, based on the matching, the data value associated with the label "User" may be entered in text field 104a, which was previously mapped to text region 104b. Similarly, using the same process, at least some of the data values in the received set may be entered in matched data fields, to automatically fill out the form, at least in part. In some embodiments, at least one of the textual regions is matched with one label. In some embodiments, at least one of the textual regions is matched with more than one label. In some embodiments, the matching is done, at least in part, using a text extraction algorithm and reverse mapping. In some embodiments, each of the data fields is then correlated with at least one of the data values based, at least in part, on the matching and associating. In some embodiments, a data value is then input into a data field based on the correlation.

Figure 1C:
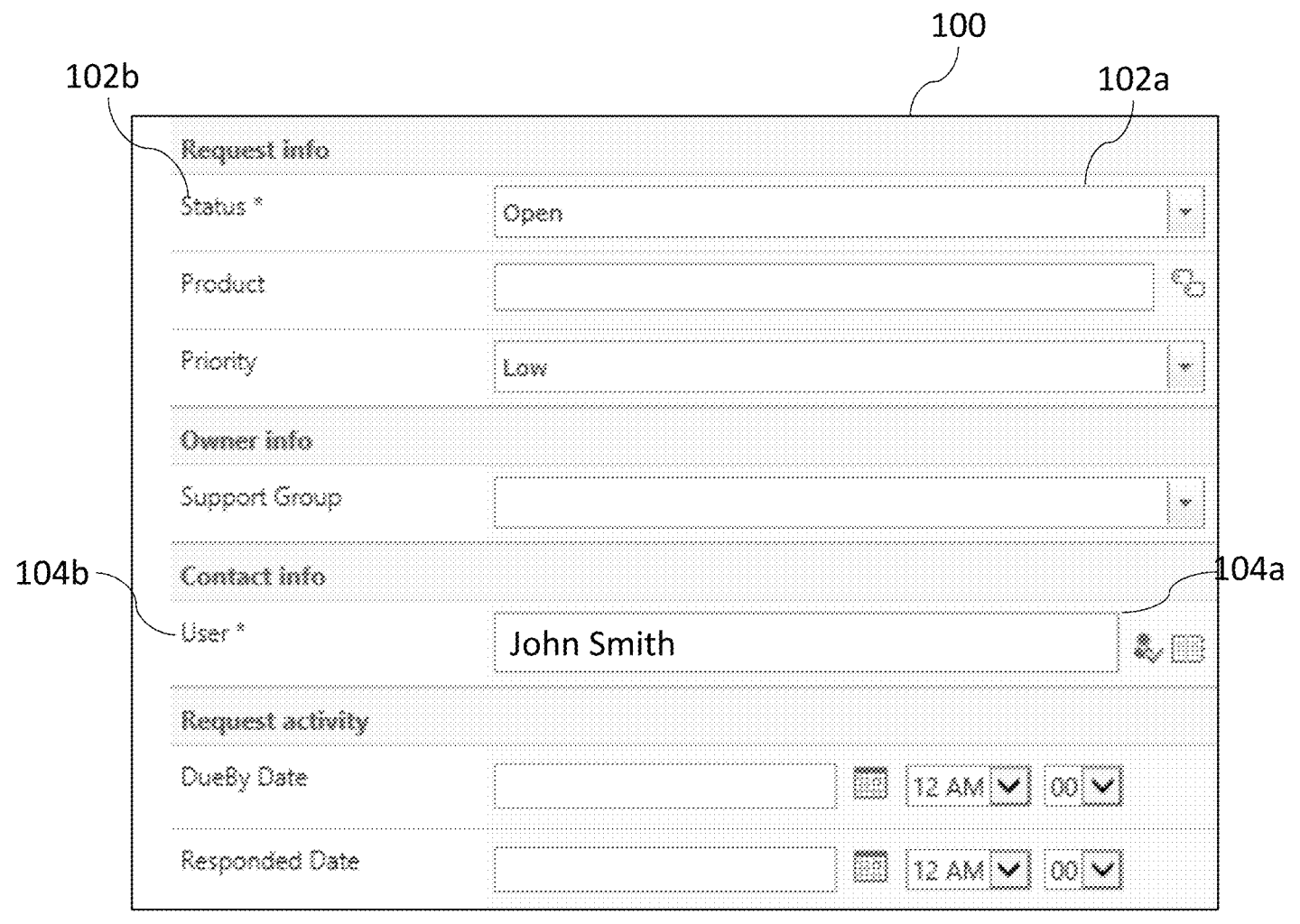

In some embodiments, the process is reversed, at least in part, wherein a value may be extracted from the form. Accordingly, a set of excepted data values and associated labels may be received. In some embodiments, the labels may be matched with the recognized textual regions in the image, e.g., with reference to FIG. 1C, a label "User" may be matched with text region (caption) "User" 104b. In some embodiments, based on the matching, a value entered in text field 104a, e.g., "John Smith" may be extracted and returned as the expected value associated with the label "User" in the received set.

Figure 2:
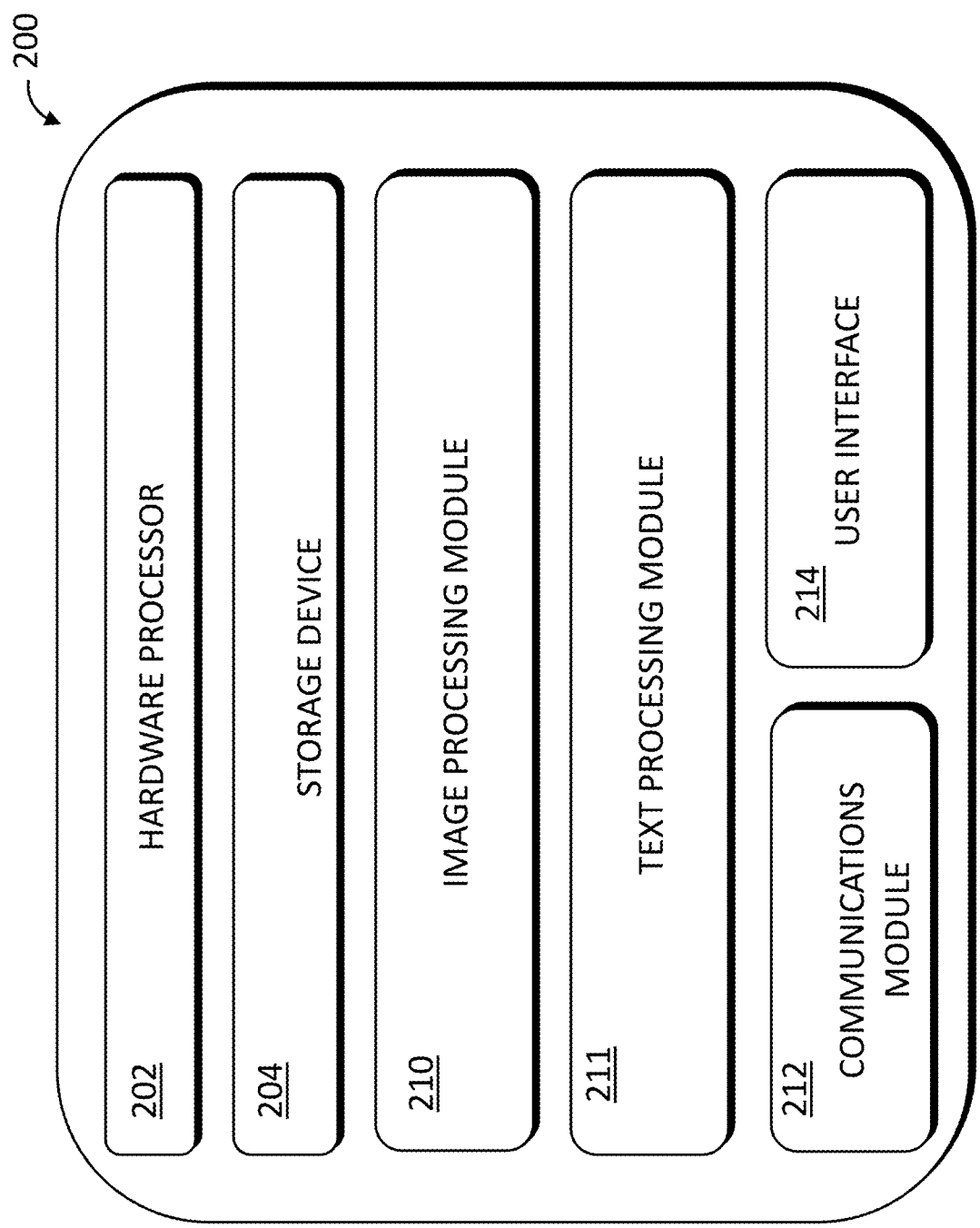
FIG. 2 is a block diagram of an exemplary system for automated form analysis, in accordance with some embodiments of the present invention.

Reference is made to FIG. 2, which is a block diagram of an exemplary system 200 for automated form analysis, according to an embodiment of the present invention. System 200 as described herein is only an exemplary embodiment of the present invention, and in practice may have more or fewer components than shown, may combine two or more of the components, or a may have a different configuration or arrangement of the components. The various components of system 200 may be implemented in hardware, software or a combination of both hardware and software. In various embodiments, system 200 may comprise a dedicated hardware device, or may form an addition to/or extension of an existing device.

System 200 may store in storage device 204 software instructions or components configured to operate a hardware processor 202. In some embodiments, the software components may include an operating system, including various software components and/or drivers for controlling and managing general system tasks (e.g., memory management, storage device control, power management, etc.) and facilitating communication between various hardware and software components.

In some embodiments, system 200 may further an image processing module 210, a text processing module 211, a communications module 212, and/or a user interface 214.

In some embodiments, the image processing module 210 may be configured to receive image data, such as, e.g., form data, and process the image data to extract and/or calculate a plurality of values and/or features derived from the data. In some embodiments, image processing module 210 may be configured to perform at least some of data field and textual region location detection and textual region content detection based on one or more image processing techniques. In some embodiments, the present disclosure may combine detection of data field location, detection of textual region location and detection of textual region content for automated form analysis.

In some embodiments, image processing module 210 may be configured to process images according to a variety of image preprocessing and processing techniques. In some embodiments, image processing module 210 may be configured to perform at least some of image editing, filtering, transformations, aspect ratio normalization, de-skewing, de-speckling, edge smoothing, magnification, binarization, image classification, feature extraction, pattern recognition, object detection, object recognition, image segmentation, line removal, layout analysis, zoning, optical character recognition, text recognition, numbering recognition, running text detection, script recognition, and/or character isolation or segmentation.

In some embodiments, the text processing module 211 may be configured to perform a variety of textual analysis tasks. In some embodiments, text processing module 211 comprises one or more of an optical character recognition (OCR) unit, and/or a natural language processing (NLP) and/or natural language understanding (NLU) unit. In some embodiments, text processing module 211 is configured to receive an image comprising textual elements, e.g., glyphs, and process the image using one or more text and/or language processing techniques to, e.g., convert the image signal into machine-encoded text and/or extract a semantic meaning from the textual content of the image signal.

In some embodiments, the communications module 212 may be configured for connecting system 200 to a network, such as the internet, a local area network, a wide area network and/or a wireless network. In some embodiments, the communications module 212 facilitates communications with other devices over one or more external ports, and also includes various software components for handling data received by system 200. In some embodiments, the user interface 214 comprises one or more of a control panel for controlling system 200, buttons, display monitor, and/or speaker for providing audio commands. In some embodiments, system 200 includes one or more user input control devices, such as a physical or virtual joystick, mouse, and/or click wheel. In other variations, system 200 comprises one or more of peripheral interfaces, RF circuitry, audio circuitry, a microphone, an input/output (I/O) subsystem, other input or control devices, optical or other sensors, and an external port. Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments.

Figure 3:
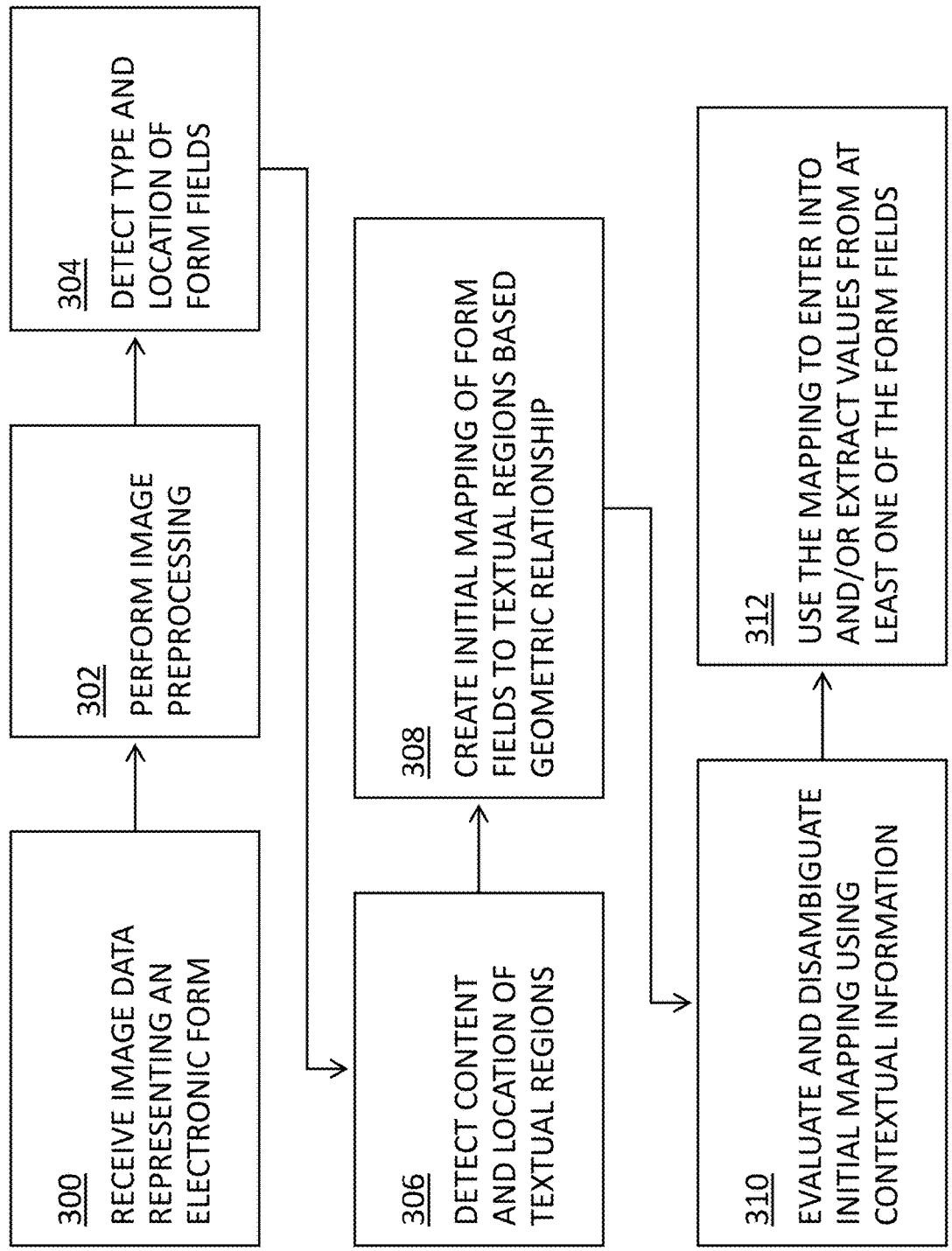
FIG. 3 is a flowchart of the functional steps in a process for automated form analysis, in accordance with some embodiments of the present invention.

Reference is made to FIG. 3 which is a flowchart of the functional steps in a process for automated form analysis, in accordance with some embodiments of the present invention.

In some embodiments, at step 300, an image of an electronic form may be received. In some embodiments, the image may be a screen capture or part thereof of a GUI of a computerized application, e.g., an electronic form displayed to a user of a computerized system. In some embodiments, the screen is part of a computer, tablet or mobile device. In some embodiments, the image data may be received as input from an external source, e.g., the image data can be sent as input from a storage device designed to manage digital storage comprising images. In some embodiments, the image is captured automatically by a computer program. In some embodiments, the image is captured by a user using a computer program or keyboard/button shortcut. In some embodiments, the image data is received in real time while the user is accessing the data form.

In some embodiments, the image data comprises an image or a series of images depicting one or more data forms. In some embodiments, the image data is stored onto a storage device, such as storage device 204.

In some embodiments, the form is a registration form, an email opt-in form, a lead generation contact form, an online payment form, an online job application form, an online form for candidate screening, a request form, a support request form, a help request form, a contact form, an application for school admission or a quality inspection form. In some embodiments, the form is laid out in a vertical format, a horizontal format, a columnar format, a table or chart format, and/or a combination of any of these formats.

In some embodiments, the form may comprise multiple data fields arranged independently of one another, and/or in a hierarchical arrangement. In some embodiments, the data fields may comprise one or more of form elements. In some embodiments, at least one of the data fields is a data display field. In some embodiments, the data fields are a combination of data entry and data display fields. In some embodiments, the data fields are at least one of a text box field, a select box field, a dropdown field, a button field, a checkbox field, a radio button field, a single line text field, a paragraph text field, an email address field, a website/URL field, a number field, a phone number field, a hidden field, an HTML field, a reCAPTCHA field, a date field, a time field, a scale field, a star rating field, a slider field, a toggle field, a dynamic field, a lookup field, a user ID field, a password field, a tag field, an address field, and/or a signature field.

In some embodiments, the received image comprises a plurality of textual regions or elements, wherein at least some of the textual regions are associated with data fields. In some embodiments, at least some of the textual regions are captions and/or descriptors associated with a data type corresponding to the data field. In some embodiments, the textual regions are text used to identify a data field for the purpose of data entry or data extraction. In some embodiments, the textual regions consist of individual characters (e.g., letters and/or numbers), line of words, and/or running text. In some embodiments, the data fields correspond to textual regions. In some embodiments a given data field corresponds to more than one textual region and/or vice-versa.

In some embodiments, at step 302, an image data processing step may be performed, e.g., by employing image processing module 210 in FIG. 1. In some embodiments, image preprocessing may comprise one or more of editing, filtering, transformations, aspect ratio normalization, de-skewing, de-speckling, edge smoothing, magnification, binarization, and/or additional and/or similar operations with respect to the image data. In some embodiments, preprocessing comprises resizing the image to a standard size. In some embodiments, the standard size is a height of 1080 pixels. In some embodiments, preprocessing comprises converting the image to a black-and-white format. In some embodiments, this conversion uses an adaptive thresholding algorithm. In some embodiments, preprocessing comprises digital image processing. In some embodiments, the output of preprocessing is an adapted image. In some embodiments, the preprocessed image is stored in storage device 204.

In some embodiments, at step 304, image processing module 210 may be applied to detect a field type and location of data fields. In some embodiments, the image is processed to detect the location of each data field. In some embodiments, the data field locations are detected using, e.g., a region and/or 'blob' detection algorithm, such as maximally stable extremal regions (MSER) algorithm.

In some embodiments, the detected image regions are further processed to obtain additional information with respect to each region, e.g., based on feature detection, edge detection, corner detection, ridge detection, interest point detection, changing intensity, autocorrelation, thresholding, template matching, Hough transform, deformable and parameterized shapes, and active contours.

In some embodiments, the results are further processed to identify regions meeting one or more shape parameter tests associated with data fields. In some embodiments, such parameters may comprise specified region aspect ratio (e.g., specified height//width ratios associated with, e.g., text boxes, buttons, and select boxes). In some embodiments, such parameters may include specified vector graphics (e.g., shapes) associated with data fields (e.g., box, square, rectangle, circle, etc.). In some embodiments, the detected data field regions are filtered based on aspect ratio or shape. In some embodiments, shape and aspect ratio filtering allow for classification of data field regions. In some embodiments, aspect ratio filtering selects for text box fields, select box fields and buttons fields. In some embodiments, shape filtering selects for square regions (e.g. check box fields) or circular regions (e.g. radio button fields). In some embodiments, the data field location data is stored onto a storage device, such as storage device 204. In some embodiments, the data field location data is saved to the system cache.

In some embodiments, at the conclusion of step 304, the present disclosure provides for a set of data fields which includes all identified data fields in the form, their field type (e.g., text box, select box, button, check box, radio button), and their location within the image (e.g., x, y coordinates of pixels associated therewith).

In some embodiments, at step 306, the image is further processed to identify regions in the image which comprise textual content, e.g., characters, letters, numbers, and/or glyphs. In some embodiments, step 306 identifies in the image regions comprising visual representations of text characters, e.g., a letter, a number, a punctuation mark, or other inline character and/or collection of characters.

In some embodiments, the present disclosure provides for an analysis of the image to detect a plurality of text regions comprising an array of image signals and associated data defining a set of boundaries of the text regions. In some embodiments, the textual region locations are detected using a text detection algorithm. In some embodiments, the text detection algorithm locates bounding box regions that contain text, based on a probability estimation. In some embodiments, the text region location data is stored in storage device 204. In some embodiments, the text region location data is saved to the system cache.

In some embodiments, at least some of the identified text regions may be extracted and assembled into an 'image sprite' comprising all text regions ordered and indexed according to a specified sequence, to facilitate text-based analysis of the text regions.

In some embodiments, text processing module 211 may then be configured to apply one or more text analysis techniques, such as OCR, NLP, and/or NLU, to process the image signals representing the text regions, e.g., using the image sprite, to, e.g., convert the image signal into machine-encoded text and/or extract a semantic meaning from the textual content of the image signal.

In some embodiments, step 306 comprises processing the image to detect the content of each of the textual regions located by the text detection algorithm. In some embodiments, the bounding box regions containing text in high probability undergo hashing (based on image bytes and region position relative to window position). In some embodiments, a dense image is created from these regions. In some embodiments, the dense image is an image sprite. Image sprites and their uses are well known to a person having ordinary skill in the art. In some embodiments, content is detected using a text extraction algorithm on the image sprite. In some embodiments, the text extraction algorithm is OCR. In some embodiments, the image data processing may comprise shaped-based and/or flexible methods of OCR. In some embodiments, text extraction is based on pattern recognition. In some embodiments, text extraction is based on feature detection.

In some embodiments, the present disclosure provides for generating and storing a text regions array comprising all text regions locations and data representing the textual content of each text region.

In some embodiments, at step 308, the present disclosure provides for mapping at least some of the detected text regions to the detected data fields.

In some embodiments, the processing step involves associating each of the data fields with at least one of the textual regions. In some embodiments, a data field is associated with the intersection of two textual regions. In some embodiments, a data field is associated with the intersection of two textual regions where the textual regions are a row of a table and a column of a table. In some embodiments, more than one data field may be associated with a given textual region. In some embodiments, the associating is based, at least in part, on the geometric relationship between the detected locations of the data fields and the detected locations of the textual regions obtained during image processing 202.

In some embodiments, mapping of text regions to data fields may be based on a relative location analysis which takes into account a geometric relationship, e.g., one or more of relative location, distance, position, alignment, and/or similar parameters in predicting a correspondence between one or more text regions and one or more data fields.

With reference to FIG. 4A, in some embodiments, initial mapping may be based on a relative location analysis, which may comprise one or more of the following parameters:

Geometric Distance:

The geometric distance of a text region to a data field may indicate an association with the data field, e.g., the closest text region to a data field may be assumed to be associated with the data field. For example, in FIG. 4A, the text region "First Name" may be associated with the nearest data field.

Geometric Alignment:

The location and position of the text region in relation to the data field may indicate an association. Text regions may be assumed to be in a specified alignment relationship with their associated data fields. For example, text regions may be located in line with or above a data field, but typically not underneath it. For example, in FIG. 4A, text regions in section 1 of the for are located in line with their associated data fields, whereas in section 2, text regions are located above their associated data fields.

In some embodiments, the geometric relationship is based on distance. In such cases, the mapping is based on the distance between the data field and textual region. In some embodiments, the desired distance is constant. In some embodiments, the geometric relationship is based on alignment. In such cases, the mapping is based on the alignment between a data field and textual region. In some embodiments, the data field is mapped with more than one textual regions. In some embodiments, the data field is mapped with two textual regions. In some such instances, the mapping is based on the data field being close to the intersection of the two textual regions. In some embodiments, mapping is based at least in part on correspondence between the number of aligned data fields and the number of data values mapped with a textual region. In some embodiments, the mapping is stored onto a storage device, such as storage device 204.

In some embodiments, at step 310, the initial mapping may be evaluated and refined based on contextual information derived from examining the overall structure and flow of the form. In some embodiments, contextual evaluation may be used to resolve conflicts and/or for disambiguation purposes. In some embodiments, contextual evaluation may be used to derive context rules which may assist in resolving mapping ambiguities and/or conflicts. In some embodiments, such evaluation may include, but is not limited to:

Page Structure:

The overall structure, flow, and order of the form elements may be an indication as to relative locations of individual components. For example, in FIG. 4A, section 1, text regions and data fields are ordered vertically, in two columns, one per line. In contrast, in section 2, text regions and data fields are ordered vertically in a single column but in alternating lines. In some cases, as illustrated in FIG. 4B, text regions and data fields are arranged in a region, where multiple text regions and data fields may be located in the same line.

Accordingly, mapping text regions to data fields may also take into account consistency in relative positioning within a form or a subsection thereof. Thus, if within a form or a section a majority of text regions are in line with data fields, then a data field associated with a text region located above it may be re-evaluated based on its status as an outlier in the initial mapping.

Distance Consistency:

The distance measure, i.e., distance, between text regions and data fields may be assumed to be relatively consistent within a form. Accordingly, the initial mapping may be evaluated based on a deviation of distance measure in a pair text region-data field from an average value calculated for the entire form or subsection thereof Page Subsections:

In some embodiments, the mapping evaluation takes into account boundaries, alignment guides, vertical or horizontal edges, gutters, boxes, white spaces, text blocks, and/or other regions indicating graphical separation of the form into sections and subsections. Accordingly, the initial mapping may be evaluated on a section-by-section basis, wherein contextual evaluation is only performed with respect to other elements and expected flow within a specific section or subsection of the form.

Figure 4C:
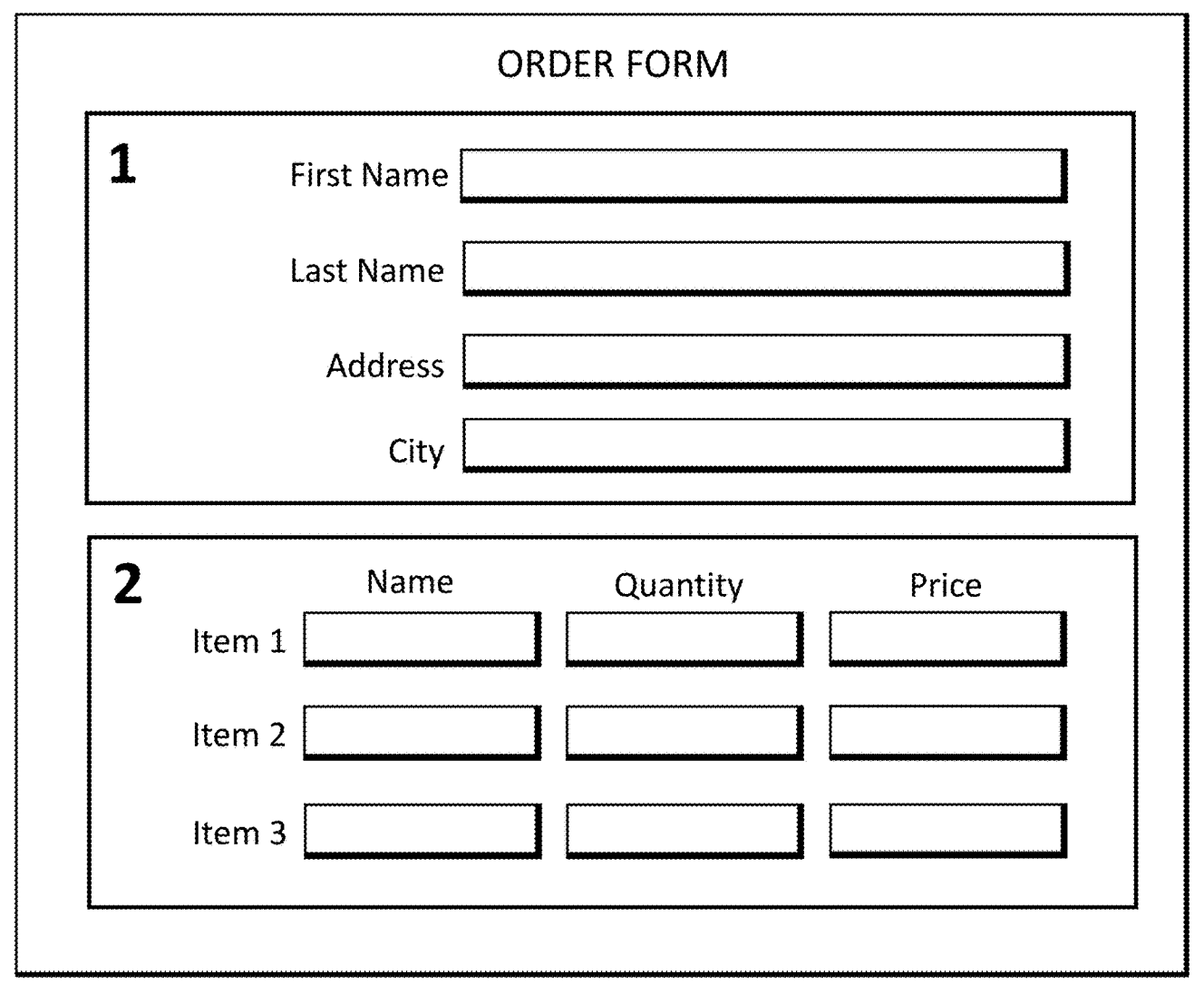

For example, in FIG. 4C, section 1, is ordered vertically, in two columns, one per line. In contrast, section 2 is ordered in a tabular formation. Accordingly, the mapping in each of sections 1 and 2 will only be evaluated against the respective contextual information within the relevant section.

Tabular Arrangements:

Some embodiments provide a method that identifies one or more sections of a form as boundaries that form a table. The method defines a tabular structural element based on the table that includes several data fields arranged in several rows and columns, where each data field includes an associated set of text regions. Some embodiments identify that the boundaries form a table by identifying a set of boundaries that form a larger rectangular shape and several rectangular shapes contained within the larger rectangular shape. In some embodiments, at least some of the identified boundaries are inferred based on positions of the associated sets of text regions that form the cells.

For example, in FIG. 4C, section 2, the data fields form a tabular structure comprising 2 text regions for each data field. As shown in FIG. 4C, a data field may have more than one label, e.g., "Item 1" and "Name" are both associated with a single data field.

Multiple Data Fields Per Label:

In some embodiments, as seen in FIG. 4C, section 2, the caption "Item 1" is associated with 3 data fields, and hence, 3 expected values —"Name," "Quantity," and "Price."

Co-Located Caption and Data Field:

In some embodiments, as can be seen in FIG. 4D, section 2, a text region may be located on and/or within a data field.

In some embodiments, step 310 may comprise evaluation and refining of the initial mapping based, at least in part, on external data sources, to derive further context rules, resolve conflicts and/or for disambiguation purposes. For example, in some embodiments, a set of data values and associated labels may be supplied, wherein the data values match, at least in part, values expected to be entered in at least some of the data fields in a given form. In some embodiments, each data value has one or more labels associated therewith, wherein the labels act as classifying phrases or names used to specify the semantic data type associated with a data value. Examples of labels include but are not limited to "name," "ID number," "order date," "address," etc.

Figure 5A:
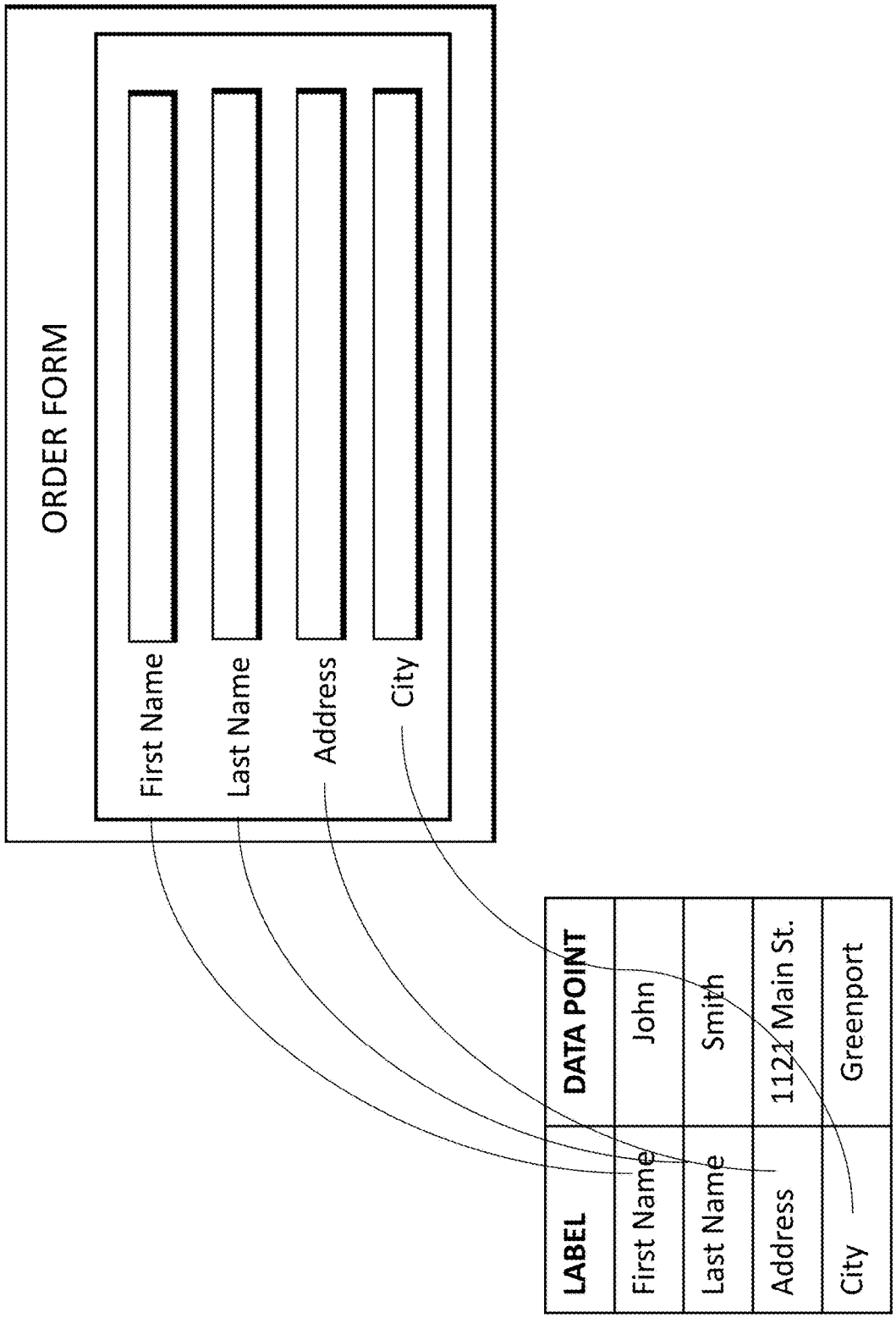

In some embodiments, as illustrated in FIG. 5A, a matching step may attempt to match each of the textual regions with at least one corresponding label in the set, based, at least in part, on the content detected at step 306. In some embodiments, the matching is based, at least in part, on finding textual regions whose content matches fully or partially the label text. In some embodiments, the matching is based, at least in part, on degrees of similarity, e.g., visual similarity, between the label and the detected textual region content. In some embodiments, the matching is based on fuzzy matching between label and textual regions. In some embodiments, a textual region is matched with more than one label.

Figure 5B:
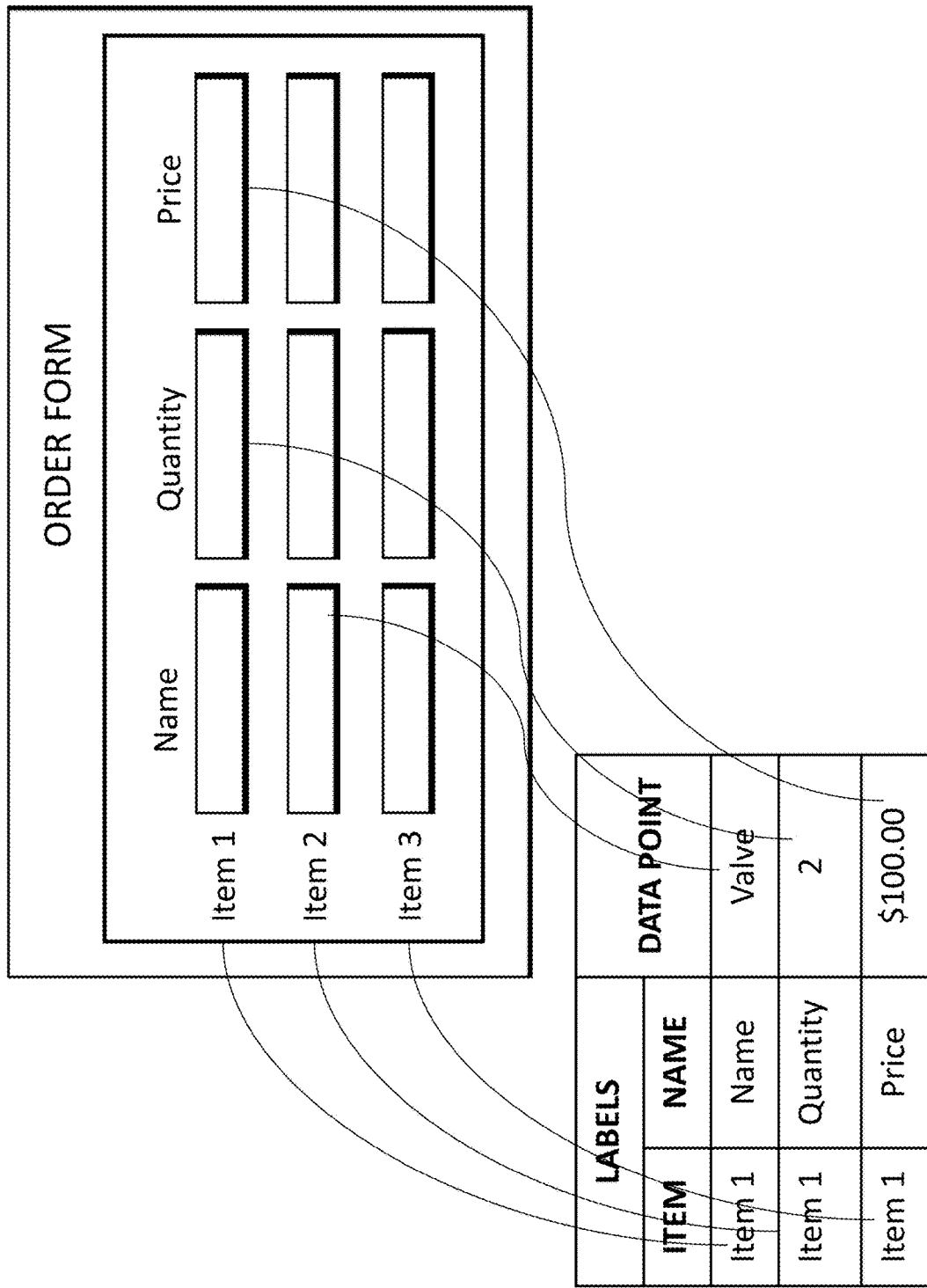

In some embodiments, the matching step between labels and text regions may provide a framework for further evaluating the mapping performed at step 308. For example:

Multiple Labels Per Data Value:

When a supplied data value has more than one associated labels, as illustrated in FIG. 5B, it may be assumed that matching text regions in the form should be mapped to a single data field. For example, the data field may be a table cell at the intersection of a column/row combination.

Multiple Labels in Hierarchical Order:

In some embodiments, multiple labels may include hierarchical indications as to the relationship between the labels. For example, as shown in FIG. 5C, identical data types (e.g., "First Name," "Last Name," "Address") are expected in both the "Billing Address" and "Shipping Address" subsections of the form. Accordingly, when filling in the form, a potential ambiguity may arise as to whether a provided value "First Name" should be entered in the "Billing Address" subsection, "Shipping Address" subsection, or in both. To disambiguate this potential conflict, supplied data values may comprise two labels indicating a hierarchy therebetween. For example, a first label may indicate the intended subsection, and the second label may indicate the relevant data field within the subsection. Thus, labels for the data value "John" and "Smith" may indicate:

Billing Address>>First Name
Billing Address>>Last Name

Based on this hierarchy, the initial mapping may be further refined to associate a further semantic meaning with each of the identical data fields, based on their subsection location within the form.

Figure 5D:
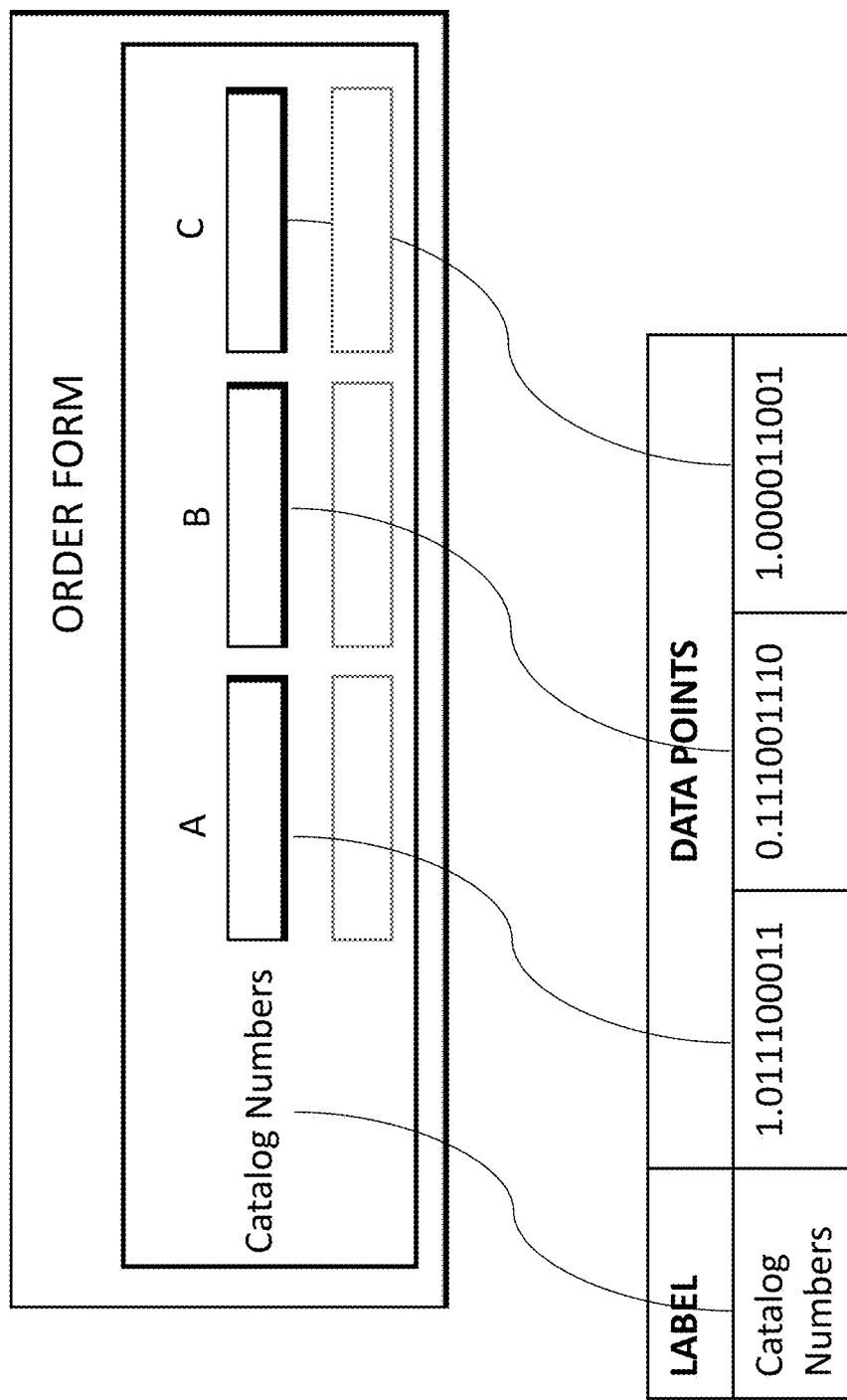

Multiple Data Values Per Label:

When a supplied label has more than one associated data value, as illustrated in FIG. 5D, it may be assumed that the matching text region will be associated with at least the same number of data fields.

Multiple Data Fields Per Data Value:

In some cases, more than one data value may be matched to multiple data fields, based on a correspondence between label/text region. In such cases, the conflict or ambiguity may be resolved based on a predetermined rule, e.g., based on geometric distance and/or other considerations.

Label Indications:

In some cases, supplied labels may have an indication as to whether they are expected to be present in a particular form or they are optional. This may help resolve conflicts when a label cannot be matched with a text region in the form. If such a label is indicated as "optional," then the process will skip this label if not match is found in the matching.

In some embodiments, at least one of the textual regions is matched with one label. In some embodiments, at least one of the textual regions is matched with more than one label. In some embodiments, the matching is done, at least in part, using a text extraction algorithm and reverse mapping. In some embodiments, each of the data fields is then correlated with at least one of the data values based, at least in part, on the matching and associating.

In some embodiments, at the conclusion of the mapping and disambiguation processes, at a step 312, the final mapping may be used in the context of automating form usage.

In some embodiments a set of data values can be received by a system, such as system 200 in FIG. 2. In some embodiments, each of the data values is associated with at least one label. In some embodiments, the data values are received as input from the system itself. In some embodiments, the data values are received as input from an external source, e.g., data values can be sent as input from a storage device designed to manage digital storage.

In some embodiments, e.g., a supplied dataset comprising a plurality of data values and associated labels may be received. In some embodiments, the labels may be matched with the recognized textual regions in the image, as described above with reference to step 310. In some embodiments, based on the mapping and matching, one or more supplied data values in the dataset may be entered in corresponding data fields, to automatically fill out the form, at least in part.

In some embodiments, the process is reversed, at least in part, wherein a value may be extracted from the form, based on the mapping and matching. Accordingly, a set of data values and associated labels may be received. In some embodiments, the labels may be matched with the recognized textual regions in the image, as described above with reference to step 310. In some embodiments, based on the matching, values entered in one or more data fields may be extracted and returned as an expected value.

In some embodiments, the method comprises first receiving a set of data values, wherein each of the data values in the set is associated with at least one label. In some embodiments, the set of data values is intended to be entered in a form. In some embodiments, the set of data values is intended to be extracted from a form. In some embodiments, the set of data values is associated with a received image of a form.

In some embodiments, a set of data values can be received by a system, such as system 200 in FIG. 2. In some embodiments, each of the data values is associated with at least one label. In some embodiments, the data values are received as input from the system itself. In some embodiments, the data values are received as input from an external source, e.g., data values can be sent as input from a storage device designed to manage digital storage.

In some embodiments, entering a data value in a data field comprises performing an intended action based on field type. For example, if the data field is a text box field, the content of the data value is input into the data field. If the data field is a select box field, an option with a value corresponding to the data value is selected in the data field. In some embodiments, this further processing comprises data entry.

In some embodiments, at step 308, a further processing step may be performed by employing text processing module 211 in FIG. 1. In some embodiments, this processing comprises extracting data from a data field. In some embodiments, this processing comprises extracting a textual region. In some embodiments, the extracting comprises copying data contained in the data field, based on the field type. In some embodiments, this further processing comprises data extraction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or region diagrams of methods, apparatus (systems) and computer program products according to embodiments of the invention. It will be understood that each region of the flowchart illustrations and/or region diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program code, the program code executable by the at least one hardware processor to:
      receive an image of an electronic document, wherein said electronic document comprises one or more data fields and corresponding textual regions,
   process said image to obtain:
      (i) a collection of said data fields comprising an indication of a location within said image and a field type of each of said data fields in said collection, and
      (ii) an array of said textual regions comprising an indication of a location within said image and a content of each of said textual regions in said array, and
   perform automatically and without user interaction the following steps:
      (a) create a mapping comprising associations of data fields in said collection with textual regions in said array based, at least in part, on analyzing a geometric relationship between each of said data fields and each of said textual regions,
      (b) derive at least one context rule for evaluating said associations, based, at least in part, on identifying a structure of said electronic document, and
      (c) determine a correctness of at least one of said associations in said mapping, based, at least in part, on said at least one context rule.

2. The system of claim 1, wherein said electronic document is presented as a graphical user interface (GUI) element, and said image is a screen capture of said GUI.

3. The system of claim 1, wherein each of said data fields is at least one of a data entry field and a data display field, and wherein each of said textual regions is one of a descriptor, a label, a title, a tag, an annotation, a caption, and a comment.

4. The system of claim 1, wherein said geometric relationship takes into account, with respect to each of said associations of one of said textual regions with one of said data fields, one or more of: a position of said textual region relative to said data field, an alignment of said textual region relative to said data field, and a distance between said textual region relative to said data field.

5. The system of claim 4, wherein said associations can comprise at least one of: a one-to-many association of a textual region to multiple data fields, a many-to-one association of multiple textual regions to a data field, and a locational overlap between a data field and a textual region.

6. The system of claim 1, wherein said identifying comprises identifying at least one of: sections in said electronic document, sub-sections in said electronic document, a vertical ordering of data fields in said electronic document, a horizontal ordering of data fields in said electronic document, average geometric distance between textual regions and data fields in said electronic document, and a tabular arrangement of data fields in said electronic document.

7. The system of claim 1, wherein said program instructions are further executable to:
   (i) access a set of data values and related labels, wherein said labels correspond, at least in part, to textual regions in said array;
   (ii) match at least some of said data values with said data fields in said collection, based on said correspondence;
   (iii) derive at least one additional context rule based on analyzing said matches; and
   (iv) determine a correctness of at least one of said associations in said mapping, based, at least in part, on said at least one additional context rule.

8. A method comprising:
   receiving an image of an electronic document, wherein said electronic document comprises one or more data fields and corresponding textual regions;
   processing said image to obtain:
      (i) a collection of said data fields comprising an indication of a location within said image and a field type of each of said data fields in said collection, and
      (ii) an array of said textual regions comprising an indication of a location within said image and a content of each of said textual regions in said array; and
   performing automatically and without user interaction the following steps:
      (a) creating a mapping comprising associations of data fields in said collection with textual regions in said array based, at least in part, on analyzing a geometric relationship between each of said data fields and each of said textual regions;
      (b) deriving at least one context rule for evaluating said associations, based, at least in part, on identifying a structure of said electronic document; and
      (c) determining a correctness of at least one of said associations in said mapping, based, at least in part, on said at least one context rule.

9. The method of claim 8, wherein said electronic document is presented as a graphical user interface (GUI) element, and said image is a screen capture of said GUI.

10. The method of claim 8, wherein each of said data fields is at least one of a data entry field and a data display field, and wherein each of said textual regions is one of a descriptor, a label, a title, a tag, an annotation, a caption, and a comment.

11. The method of claim 8, wherein said geometric relationship takes into account, with respect to each of said associations of one of said textual regions with one of said data fields, one or more of: a position of said textual region relative to said data field, an alignment of said textual region relative to said data field, and a distance between said textual region relative to said data field.

12. The method of claim 11, wherein said associations can comprise at least one of: a one-to-many association of a textual region to multiple data fields, a many-to-one association of multiple textual regions to a data field, and a locational overlap between a data field and a textual region.

13. The method of claim 8, wherein said identifying comprises identifying at least one of: sections in said electronic document, sub-sections in said electronic document, a vertical ordering of data fields in said electronic document, a horizontal ordering of data fields in said electronic document, average geometric distance between textual regions and data fields in said electronic document, and a tabular arrangement of data fields in said electronic document.

14. The method of claim 8, further comprising:
(i) accessing a set of data values and related labels, wherein said labels correspond, at least in part, to textual regions in said array;
(ii) matching at least some of said data values with said data fields in said collection, based on said correspondence;
(iii) deriving at least one additional context rule based on analyzing said matches; and
(iv) determining a correctness of at least one of said associations in said mapping, based, at least in part, on said at least one additional context rule.

15. A computer program product comprising a non-transitory computer-readable storage medium having program code embodied therewith, the program code executable by at least one hardware processor to:
receive an image of an electronic document, wherein said electronic document comprises one or more data fields and corresponding textual regions;
process said image to obtain:
(i) a collection of said data fields comprising an indication of a location within said image and a field type of each of said data fields in said collection, and
(ii) an array of said textual regions comprising an indication of a location within said image and a content of each of said textual regions in said array; and
perform automatically and without user interaction the following steps:
(a) create a mapping comprising associations of data fields in said collection with textual regions in said array based, at least in part, on analyzing a geometric relationship between each of said data fields and each of said textual regions; and
(b) derive at least one context rule for evaluating said associations, based, at least in part, on identifying a structure of said electronic document; and
(c) determine a correctness of at least one of said associations in said mapping, based, at least in part, on said at least one context rule.

16. The computer program product of claim 15, wherein each of said data fields is at least one of a data entry field and a data display field, and wherein each of said textual regions is one of a descriptor, a label, a title, a tag, an annotation, a caption, and a comment.

17. The computer program product of claim 15, wherein said geometric relationship takes into account, with respect to each of said associations of one of said textual regions with one of said data fields, one or more of: a position of said textual region relative to said data field, an alignment of said textual region relative to said data field, and a distance between said textual region relative to said data field.

18. The computer program product of claim 17, wherein said associations can comprise at least one of: a one-to-many association of a textual region to multiple data fields, a many-to-one association of multiple textual regions to a data field, and a locational overlap between a data field and a textual region.

19. The computer program product of claim 15, wherein said identifying comprises identifying at least one of: sections in said electronic document, sub-sections in said electronic document, a vertical ordering of data fields in said electronic document, a horizontal ordering of data fields in said electronic document, average geometric distance between textual regions and data fields in said electronic document, and a tabular arrangement of data fields in said electronic document.

20. The computer program product of claim 15, wherein said program instructions are further executable to:
(i) access a set of data values and related labels, wherein said labels correspond, at least in part, to textual regions in said array;
(ii) match at least some of said data values with said data fields in said collection, based on said correspondence;
(iii) derive at least one additional context rule based on analyzing said matches; and
(iv) determine a correctness of at least one of said associations in said mapping, based, at least in part, on said at least one additional context rule.

* * * * *